United States Patent [19]

Maertens et al.

[11] 3,883,495

[45] May 13, 1975

[54] PROCESS AND CATALYST FOR RING OPENING POLYMERISATION

[75] Inventors: Dieter Maertens; Gunther Lehnert, both of Leverkusen; Manfred Zimmermann, Cologne, all of Germany

[73] Assignee: Bayer Aktiengesellschaft, Germany

[22] Filed: Apr. 4, 1973

[21] Appl. No.: 347,775

[30] Foreign Application Priority Data
Apr. 8, 1972 Germany............................ 2217048

[52] U.S. Cl..... 260/93.1; 252/429 B; 260/33.6 UA; 260/82.1; 260/88.2 E; 260/88.2 R
[51] Int. Cl. ............................................. C08f 1/56
[58] Field of Search .......... 260/93.1, 88.2 E, 88.2 R

[56] References Cited
UNITED STATES PATENTS
3,657,208  4/1972  Judy............................... 260/88.2 R
3,707,520  12/1972  Pampus et al............... 260/33.6 AQ
3,790,544  2/1974  Maertens et al.................. 260/93.1

Primary Examiner—Stanford M. Levin
Attorney, Agent, or Firm—Connolly and Hutz

[57] ABSTRACT

A catalyst of
  a. a molybdenum salt
  b. an ether
  c. an organo aluminium compound and
  d. a Lewis acid is described as well as a process for its manufacture. This catalyst is used to polymerise and copolymerise cyclic olefins under ring opening to form polyalkenamers. Polymerisation in an inert organic solvent is preferred. The polymers obtained are vulcanisable rubbers or thermoplasts.

3 Claims, No Drawings

PROCESS AND CATALYST FOR RING OPENING POLYMERISATION

It is known to polymerise cyclic olefins having one or more unconjugated carbon double bonds in the ring in the presence of catalysts based on molybdenum salts and organo aluminium compounds, to produce linear or macrocyclic, high molecular weight, unsaturated hydrocarbons. Thus bulk polymerisation of cyclopentene to produce cis-polypentenamers using molybdenum catalysts has been described in British Pat. No. 1,010,860. This bulk polymerisation results in very viscous masses so that the heat of reaction cannot be removed and polymerisation temperature becomes impossible to control. An uncross-linked product which is suitable for further processing is obtained only if polymerisation is terminated at 20 to 50 % monomer conversion. At higher conversion, the products becomes insoluble, cross-linked and unsuitable for further processing. As demonstrated by the working examples of British Pat. No. 1,010,860 the catalyst amounts required to generate a sufficient number of active polymerisation sides are so large that the catalyst cannot dissolve homogeneously. Polymerisation therefore occurs upon contact with the activated undissolved catalyst and upon contact with the dissolved catalyst present. The polymers obtained are thus rendered non-uniform; the undissolved catalyst promotes crosslinking. On polymer recovery it becomes difficult to remove the undissolved catalyst as it is coated with polymer so that the final product is discoloured and exhibits high ash (catalyst residue) content. Moreover, long reaction times are required.

British Pat. No. 1,062,367 teaches a process for producing polyalkenamers (nomenclature according to M. L. Huggins, J. Polymer. Science 8, 257 (1952)), on catalysts constituting inter alia mixtures of a molybdenum salt (e.g. $MoCl_5$), a compound containing an O—O or O—H bond and an organo aluminium compound which is optionally complexed with electron donors such as ethers.

This process is also generally carried out in bulk causing temperature control difficulties. Here again, only yields of 30 to 50 % are obtained and large quantities of catalyst are required. Polymerisation time is shorter.

However, interrupting the polymerisation gives rise to considerable technical difficulties owing to the high viscosities of the reaction mixtures. Removal of catalyst residues and uniform distribution of the stabiliser in the polymer are very difficult when the process is carried out on a large technical scale.

If the processes of the aforesaid Patents are carried out in the presence of inert solvents, e.g. in aliphatic or aromatic hydrocarbons, the conversion of cyclic olefins into polyalkenamers is still further reduced.

This invention relates to a new catalyst based on molybdenum which promotes ring opening polymerisation of cyclic olefins in inert organic solvents and yields much higher conversion at much smaller catalyst consumption. As only small amounts of catalyst are required and as the atomic weihgt of molybdenum (95.94) is low (as compared with tungsten (183.85) which has previously been used in catalysts for solution polymerisation), recovering of solid polymers from their solution in inert solvents is simplified considerably because the amount of catalyst residues is small enough to be left in the polymer or can easily be removed. Thus polymers with a very low ash content are obtained. As the catalyst of this invention dissolves completely in the polymerisation solution, colourless gel-free polymers are obtained even at high conversion rates.

One object of this invention is a catalyst suitable for the ring opening polymerisation of cyclic olefins, which consists of a. at least one molybdenum salt,
b. an ether
c. an organo aluminium compound and
d. a Lewis acid.

Another object of this invention is a process for the preparation of a catalyst suitable for the ring opening polymerisation of cyclic olefins, wherein a. at least one molybdenum salt,
b. an ether,
d. a Lewis acid are first reacted optionally while dissolved or suspended in an inert liquid, and c. the organo aluminium compound is then added either before or after addition of a solution in an organic solvent of the cyclic olefin which is to be polymerised.

The invention also relates to a process for the ring opening polymerisation of cyclic olefins wherein a solution of a cyclic olefin in an organic solvent is contacted with a catalyst consisting of a. at least one molybdenum salt,
b. an ether
c. an organo aluminium compound and
d. a Lewis acid at temperatures of −50°C to +50°C.

Monomers suitable for the polymerisation according to the invention are cyclic olefins having 4, 5, 7, 8 or more ring carbon atoms and one carbon-carbon double bond, or a plurality of non-conjugated carbon-carbon double bonds in the ring, e.g. cyclobutene, cyclopentene, cycloheptene, norbornene, norbornadiene-(2,5), cyclooctadiene-(1,5), cyclododecene or cyclododecatriene-(1,5,9). These olefins can be substituted, for example, by alkyl, aryl, alkylaryl or halogen. They can be homopolymerised or copolymerised with each other.

They can also be copolymerised with up to 30 % by weight of open chain olefins, inter alia with conjugated aliphatic dienes containing e.g. 4 to 8 carbon atoms, e.g. butadiene-(1,3), 2-methylbutadiene-(1,3), 2-chlorobutadiene-(1,3), 2,3-dimethylbutadiene-(1,3), and pentadiene-(1,3) or aliphatic mono- or polyolefins especially those which contain 3 to 10 carbon atoms, e.g. propene, butene-(1), butene-(2), pentene-(1), hexene-(1), pentadiene-(1,4) or hexadiene-(1,4).

Particularly suitable molybdenum salts for the process according to the invention are e.g. the halides, oxyhalides, and interhalides with fluorine, chlorine, bromine and iodine, for example $MoF_6$, $MoF_5Cl$, $MoCl_5$, $MoCl_4$, $MoBr_4$, $MoI_4$, $MoOF_4$, $MoO_2F_2$, $MoOCl_4$, $MoOCl_3$, or $MoO_2Cl_2$.

Component (b) is preferably an ether of the general formula $R^1 — O — R^2$ in which $R^1$ and $R^2$ represent alkyl (preferably containing 1 – 12 carbon atoms), cycloalkyl (preferably containing 5 – 10 carbon atoms), aryl (preferably containing 6 – 20 carbon atoms) or alkylaryl (preferably containing 1 – 6 carbon atoms in the alkyl portion and 6 – 10 carbon atoms in the aryl portion) and $R^1$ and $R^2$ may be joined together to form a ring. The rings are preferably saturated hydrocarbon rings with 5 to 7 ring members (including oxygen atoms(s)) which may also contain additional oxygen atoms. In addition, $R_1$ and $R_2$ may be partly or completely halogenated (e.g. chlorinated). The following are representative examples: dimethylether, methyl ethyl ether, diethylether, $\beta,\beta'$-dichlorodiethylether, dibutylether 4,4'-dichlorodibutylether, dicyclohexylether, diphenylether, anisole, phenetole, dibenzylether, tetrahydrofuran and dioxane.

The organo aluminium compounds are preferably compounds of the general formula $AlX_nR_{3-n}$ in which R represents alkyl (preferably containing 1 – 12 carbon atoms), cycloalkyl (preferably containing 5 – 10 carbon atoms), aryl (preferably containing 6 – 20 carbon atoms) or alkylaryl (preferably containing 7 – 20 carbon atoms) and X may be halogen (F,Cl,Br,I), hydrogen or an alkoxy group (preferably containing 1 – 10 carbon atoms); $n$ represents 0,1,1.5 or 2.

Particularly suitable organo aluminium compounds are aluminium trialkyls which contain 1 – 12 carbons atoms in the alkyl groups, e.g. triethylaluminium, triisobutylaluminium, tri-n-hexylaluminium or tridodecylaluminium and dialkylaluminium chlorides which contain 1 – 12 carbon atoms in the alkyl groups, such as diethylaluminium chloride, diisopropyl aluminium chloride, dihexylaluminium chloride or didodecyl aluminium chloride. Instead of the chloride, the corresponding fluorides, bromides or iodides may be used. The analogous alkylaluminium-di-halides are also suitable. Aluminium dialkyl hydrides containing 1 – 12 carbon atoms in the alkyl groups are also suitable, for example diethyl aluminium hydride, diisopropylaluminium hydride or didodecyl aluminium hydride. The corresponding alkoxy aluminium dialkyls may also be used, for example ethoxyaluminium diethyl or butoxyaluminium dihexyl. Mixtures of organo aluminium compounds may also be used. One particularly well known example of this is aluminium sesquichloride, an equimolar mixture of diethylaluminium chloride and ethyl aluminium dichloride.

The Lewis acids (component d) used are mainly the halides of groups 3a, 4a, 4b, and 5b of the Periodic Table (Handbood of Chemistry and Physics, 47th Edition, Chemical Rubber Co., Cleveland Ohio, USA (1966)).

The following are representative examples: $BF_3$, $BCl_3$, $BBr_3$, $AlCl_3$, $AlBr_3$, $AlI_3$, $GaCl_3$, $SiCl_4$, $GeCl_4$, $SnCl_4$, $TiCl_4$, $TiBr_4$, $ZrCl_4$, $ZrBr_4$, $VCl_4$, $VOCl_3$, $NbCl_5$ and $TaCl_5$. According to a particularly preferred embodiment of the process, the etherates of boron and/or aluminium halides (components b) and d)) are preformed with the molybdenum salt (component a)).

Polymerisation with the catalyst system according to the invention is preferably carried out in solution. Suitable inert solvents are aliphatic or cycloaliphatic hydrocarbons which contain 5 to 12 carbon atoms such as pentane, hexane, heptane, cyclohexane or commercial petroleum hydrocarbon fractions of 35° to 200°C, aromatic hydrocarbons such as benzene, toluene, or xylene, halogenated aliphatic or aromatic hydrocarbons such as chlorobenzene or dichlorobenzene or mixtures of the above mentioned solvents.

The concentration of the monomers based on the reaction mixture is generally 5 to 50% by weight, preferably 15 to 30% by weight.

The quantity of molybdenum salt (component a) used is generally 0.01 to 10 mmol, preferably 0.1 to 1 mmol per 100 g of monomer.

The molar ratio of components a:b is generally in the region of 1:0.1 to 1:10, in particular 1:0.5 to 1:5. The molar ratio of components a:c is generally between 1:0.3 and 1:10, preferably between 1:0.5 and 1:5. The molar ratio of components a:d is generally between 1:0.1 and 1:10, preferably between 1:0.5 and 1:5.

To carry out the polymerisation, a suspension or solution is prepared from components a, b and d and if desired one of the above mentioned organic solvents and stirred for several minutes or up to several days at temperatures of −40°C to 40°C with exclusion of air and moisture. The suspension or solution is generally 2.5 to 0.5 molar with respect to Mo. According to a preferred embodiment of the process, component a may also be reacted with a liquid addition product of components b and d. This solution or suspension may, if desired, be diluted with a chlorinated aromatic hydrocarbon in which the ratio of aromatic carbon atoms to aromatically bound chlorine atoms should be between 6:1 and 2:1. The following are particularly suitable chlorinated aromatic hydrocarbons: chlorinated benzenes, e.g. chlorobenzene, o-dichlorobenzene or 1,2,4-trichlorobenzene, chlorinated toluenes, e.g. chlorotoluene or dichlorotoluene, chlorinated xylene or chlorinated diphenyls containing 3 to 6 chlorine atoms per molecule.

It is particularly preferred to use chlorinated aromatic compounds which remain in the polymer when the polymer solutions are processed. This considerably simplifies recycling and purification of the solvent. The solution which contains components a, b and d or their reaction products is added to a solution of the monomers in the selected inert solvent, and the organo aluminium compound (component c) is added. A part or all of component c is preferably added to the mixture of solvent and monomer before addition of the solution of a, b and d in order to remove polymerisation inhibitors.

In many cases the activity of the catalyst can be increased by the addition of elementary iodine. 0.25 to 4 mmol of iodine per mol of molybdenum are generally added before or after the molybdenum component. The iodine is preferably used in the form of a solution in aromatic hydrocarbons such as benzene or toluene.

The process is generally carried out with exclusion of air and moisture, e.g. under a protective gas atmosphere, for example under nitrogen or argon. The pressure at which polymerisation is carried out is not critical but should be so chosen that the polymerisation system is liquid. Polymerisation generally proceeds at temperatures of between −50° and +50°C, preferably −20° to +30°C. When polymerisation has finished the catalyst is inactivated by adding alcohols such as ethanol or isopropanol or organic acids such as formic acid or stearic acid. The small quantities of catalyst residues may either be left in the polymer or converted into complex compounds by chelate forming substances such as ethanolamine or ethylene diamine and then dissolved to remove them. The polymers can be stabilised against the action of oxygen by the addition of known antioxidants such as 2,6-di-tertiary-butyl-4-methylphenol, 2,2'-dihydroxy-3,3'-di-tertiary-butyl-5,5'dimethyldiphenylmethane or phenyl-$\beta$-naphthylamine.

The polymerisation may be carried out continuously or discontinuously. The polymers can be precipitated from their solutions by the usual methods of adding non-solvents such as alcohols, e.g. methanol or ethanol. In a large scale operation it is preferred to isolate the polymer by introducing the inactivated and stabilised polymer solution into hot water. The solvent and water then distil off as an azeotropic mixture and the polymer precipitates in the form of lumps. The rubbery lumps still moist with water can be dried in a drying clamber, on a belt conveyor drier or in a screw extruder.

The catalyst of the invention enables polymerisation in inert solvents. Gel-free, uniform and colourless polyalkenamers are obtained in very high yields with small quantities of catalyst.

These polymers constitute vulcanisable rubbers or thermoplasts, are eminently suitable for processing in the usual rubber and plastics processing gear and yield shaped products with excellent properties.

In the following examples, only dry apparatus and reagents are used and the reactions are carried out under a protective gas atmosphere of nitrogen.

EXAMPLE 1

A series of polymerisation experiments is carried out in 500 ml pressure bottles fitted with perforated crown stoppers and butyl rubber seals. The solvent is dried azeotropically in the bottle in known manner. The monomers and catalysts components are injected with syringes.

The molybdenum component of the catalyst system is prepared as follows:

12 mmol of $MoCl_5$ (prepared from $MoO_3$ and $SOCl_2$ by the method of H. Seifert and H. Quak, Angew. Chem. 73, 621 (1961)) are suspended in 36 mmol of distilled $BF_3 \cdot O(C_2H_5)_2$ and the suspension is stirred for about 10 hours at 20°C. 16 ml of a chlorinated biphenyl corresponding to the formula $C_{12}H_7Cl_3$ are then added with continued stirring. Subsequently toluene is added so that 1 ml of the resulting solution contains 0.05 mmol of molybdenum.

The catalyst components are added to a solution of 30 g of monomer in 120 ml solvent in the following sequence:

1. organo aluminium compound,
2. molybdenum component,
3. if desired additional organic aluminium compounds.

Polymerisation is carried out for 3 hours. At the end of this time, polymerisation is stopped by adding a mixture of 2 ml of toluene, 0.6 ml of isopropanol, 0.4 ml of tri-n-butylamine and 0.2 g of 2,2'-dihydroxy-3,3'-ditertiary-butyl-5,5'-dimethyl-diphenylmethane. The polymer is precipitated with about 1 litre of ethanol and dried to constant weight under vacuum at 50°C. Details of the experiments and the results obtained are summarised in Table 1.

All $[\eta]$ values (intrinsic viscosity) were determined in toluene at 25°C; the trans-double bond contents of the polymers were determined by the IR spectra.

Table 1

| A | B | C | D | E | F | G | H | I | K | L |
|---|---|---|---|---|---|---|---|---|---|---|
| 1 | 30 g CPE 75mg BE | toluene | 0.2 | 0.12 | 0.08 | $EtOAlEt_2$ | 20 | 67.2 | 80.6 | 0.6 |
| 2 | 30 g CPE | toluene | 0.2 | 0.05 | 0.35 | $Et_3Al_2Cl_3$ | 20 | 59.5 | 77.9 | 4.0 |
| 3 | 30 g CPE | toluene | 0.2 | 0.05 | 0.35 | $Et_3Al_2Cl_3$ | 35 | 47.7 | 79.6 | n.d. |
| 4 | 30 g CPE | toluene | 0.15 | 0.05 | 0.05 | $AlEt_3$ | 20 | 54.6 | 78.2 | n.d. |
| 5 | 30 g COE | toluene | 0.5 | 2.5 | — | $Et_2AlCl$ | 20 | 22.8 | n.d. | n.d. |
| 6 | 30 g CPE 15mg BE | toluene | 0.2 | 0.12 | 0.08 | $EtOAlEt_2$ | 20 | 70.0 | 80.7 | 1.3 |
| 7 | 30 g CPE | toluene | 0.3 | 0.12 | 0.08 | $EtOAlEt_2$ | 0 | 72.1 | 76.7 | 4.4 |
| 8 | 30 g COD | toluene | 0.13 | 0.13 | — | $EtOAlEt_2$ | 20 | 37.1 | 19.0 | 0.5 |
| 9 | 30 g CPE | cyclo-hexane | 0.15 | 0.13 | — | $EtOAlEt_2$ | 30 | 44.7 | 72.9 | n.d. |
| 10 | 30 g CPE | toluene | 0.2 | 0.125 | — | $EtOAlEt_2$ | 0 | 76.3 | 75.7 | 5.7 |
| 11 | 30 g CPE | chloro-benzene | 0.15 | 0.17 | — | $EtOAlEt_2$ | 0 | 83.6 | 68.7 | 5.9 |

Example 2

The procedure is the same as described in Example 1 but using $MoCl_5$ which has been prepared from molybdenum powder and chlorine. The results are shown in Table 2.

Table 2

| A | B | C | D | E | F | G | H | I | K |
|---|---|---|---|---|---|---|---|---|---|
| 1 | 30 g CPE | toluene | 0.3 | 0.05 | 0.6 | $Et_2AlCl$ | 20 | 40.6 | 74.4 |
| 2 | 30 g CPE | toluene | 0.3 | 0.15 | — | $EtOAlEt_2$ | 0 | 55.9 | 71.0 |
| 3 | 30 g CPE | toluene | 0.3 | 0.15 | — | $EtOAlEt_2$ | 20 | 67.5 | 76.9 |

Example 3

The procedure is the same as described in Example 1 but using $MoCl_5$ and $BF_3 \cdot O(C_2H_5)_2$ in a molar ratio of 1 : 10. The results are shown in Table 3.

Table 3

| A | B | C | D | E | F | G | H | I | K |
|---|---|---|---|---|---|---|---|---|---|
| 1 | 30 g CPE | toluene | 0.3 | 0.05 | 0.6 | $Et_2AlCl$ | 0 | 42.6 | 68.7 |
| 2 | 30 g CPE | toluene | 0.3 | 0.05 | 0.6 | $Et_2AlCl$ | 20 | 60.5 | 79.9 |
| 3 | 30 g CPE | toluene | 0.3 | 0.15 | — | $EtOAlEt_2$ | 0 | 69.5 | 75.8 |

EXAMPLE 4

(Comparison example):

To demonstrate that the reaction of the molybdenum salt with ether and Lewis acid is essential, cyclooctadiene-(1,5) is polymerised for 3 hours at 20°C as described in Example 1, No. 8 with a solution of $MoCl_5$ in chlorobenzene and $(C_2H_5)_2AlCl$ in a molar ratio of 1:2. No polymer which can be precipitated is obtained.

EXAMPLE 5

(Comparison example);

To demonstrate the effect of the Lewis acid, $MoCl_5$ is reacted with 4,4'-dichlorodibutylether in a molar ratio of 1:3 for 10 hours at 20°C by the method described in Example 1, No. 2 and the resulting solution is used for the polymerisation of cyclopentene.

Only 2.8 g (9.3% of the theory) of polypentenamer containing 66.9% of trans-double bonds are obtained.

EXAMPLE 6

2.5 kg of cyclopentene and 1 g of butene-(1) are dissolved in 7.5 kg of toluene in a 40 litres autoclave of stainless steel. A solution of 7.5 mmol of $MoCl_5$ (prepared as described in Example 1) and 22.5 mmol of $BF_3.O(C_2H_5)_2$ in 10 ml of chlorinated biphenyl of the theoretical formula $C_{12}H_7Cl_3$ is added at 20°C and the catalyst is activated with 13.1 mmol of $(C_2H_5)_2Al(OC_2H_5)$. After 3 hours at 20°C, the product is recovered as described in Example 1.

Yield: 73.5% of the theory; $[\eta] = 3.02$, trans-double bond content: 77.5%

EXAMPLE 7

The procedure is the same as described in Example 1 but varying quantities of a 0.1 molar solution of iodine in toluene are added to the polymerisation mixtures after the molybdenum component of the catalyst system.

100 ml of toluene and 30 g of cyclopentene are used for each batch of reaction mixture.

The results are shown in Table 4.

Table 4

| A | D | E | F | G | H | I | K | L | M |
|---|---|---|---|---|---|---|---|---|---|
| 1 | 0.2 | 0.05 | 0.4 | $Et_2AlCl$ | 0 | 74.9 | 70.2 | n.d. | 0.2 |
| 2 | 0.2 | 0.05 | 0.4 | $Et_2AlCl$ | 20 | 66.0 | 79.9 | n.d. | 0.1 |
| 3 | 0.2 | 0.1 | 0.1 | $EtOAlEt_2$ | 0 | 72.0 | 68.7 | 4.9 | 0.2 |
| 4 | 0.2 | 0.1 | 0.1 | $EtOAlEt_2$ | 0 | 71.3 | 72.0 | 4.9 | 0.1 |
| 5 | 0.2 | 0.1 | 0.1 | $EtOAlEt_2$ | 0 | 73.1 | 76.0 | 5.0 | 0.05 |

Legend to the tables

| | |
|---|---|
| A = | Number of experiment |
| B = | Monomers: CPE = cyclopentene |
| | BE = butene-(1) |
| | COE = cyclooctene |
| | COD = cyclooctadiene-(1,5) |
| C = | solvent (120 ml for each batch) |
| D = | mmol of the molybdenum component |
| E = | mmol of the organo aluminium compound added before the molybdenum component. |
| F = | mmol of organo aluminium compound added after the molybdenum component |
| G = | organo aluminium compound (et = $C_2H_5$) |
| H = | polymerisation temperature in °C |
| I = | polymer yield in % of the theory |

Legend to the tables

| | |
|---|---|
| K = | trans double bond content of the polymers in % of the total double bonds |
| L = | intrinsic viscosity determined in toluene at 25°C |
| M = | mmol of iodine |
| n.d.= | not determined. |

We claim:

1. A process for polymerizing a cyclic olefin having 4, 5, 7, 8 or more ring carbon atoms and 1 carbon-to-carbon double bond or a plurality of non-conjugated carbon-to-carbon double bonds in the ring, said process comprising contacting said cyclic olefin with a catalyst of
   a. a molybdenum halide or oxyhalide,
   b. an ester of the formula $$R_1-O-R_2$$

wherein
   $R_1$ and $R_2$ are alkyl having 1 to 12 carbon atoms, cycloalkyl having 5 to 10 carbon atoms, aryl having 6 to 20 carbon atoms or aralkyl having 1 to 6 carbon atoms in the alkyl moiety and 6 to 10 carbon atoms in the aryl moiety or $R_1$ and $R_2$ together with the oxygen to which they are attached form a 5- to 7-membered ring,
   c. an organo aluminum compound of the formula $$AlX_nR_{3-n}$$

wherein
   R is alkyl having 1 to 12 carbon atoms, cycloalkyl having 5 to 10 carbon atoms, aryl having 6 to 20 carbon atoms or alkaryl having 7 to 20 carbon atoms, X is hydrogen, halogen or alkoxy having 1 to 10 carbon atoms and n is 0, 1, 1.5 or 2,
   d. a Lewis acid and
   e. elementary iodine
   at a temperature of −50° to 50°C. and recovering resulting polymer, the molar ratio of a):b) being 1:0.1 to 1:10, the molar ratio of (a):(c) being 1:0.1 to 1:10, the molar ratio of (a):(d) being 1:0.1 to 1:10, said elementary iodine being present in an amount of 0.25 to 4 mmols per mol of molybdenum and said catalyst being present in an amount of from 0.01 to 10 mmol per 100 g. of cyclic olefin.

2. The process of claim 1 wherein polymerisation is carried out in an inert organic solvent.

3. The process of claim 1 wherein said Lewis acid is a halide of an element of Group IIIa, IVa, IVb or Vb of the Periodic Table.

* * * * *